US007327883B2

(12) United States Patent
Polonowski

(10) Patent No.: US 7,327,883 B2
(45) Date of Patent: Feb. 5, 2008

(54) CHARACTER RECOGNITION SYSTEM AND METHOD

(75) Inventor: Jean-Pierre Polonowski, Ville Mont Royal (CA)

(73) Assignee: IMDS Software Inc., Montreal, Quebec (CA)

( * ) Notice: Subject to any disclaimer, the term of this patent is extended or adjusted under 35 U.S.C. 154(b) by 579 days.

(21) Appl. No.: 10/384,649

(22) Filed: Mar. 11, 2003

(65) Prior Publication Data

US 2003/0169925 A1    Sep. 11, 2003

(30) Foreign Application Priority Data

Mar. 11, 2002    (CA)    .................................... 2375355

(51) Int. Cl.
*G06K 9/18*    (2006.01)
(52) U.S. Cl. ..................... 382/182; 382/185; 382/186
(58) Field of Classification Search .............. 382/182, 382/185, 186
See application file for complete search history.

(56) References Cited

U.S. PATENT DOCUMENTS

| | | | |
|---|---|---|---|
| 4,024,500 A | 5/1977 | Herbst et al. |
| 4,162,482 A | 7/1979 | Su |
| 4,177,448 A | 12/1979 | Brayton |
| 4,232,290 A | 11/1980 | Yasuda et al. |
| 4,468,808 A | 8/1984 | Mori et al. |
| 4,491,960 A | 1/1985 | Brown |
| 4,495,646 A | 1/1985 | Gharachorloo |
| 4,764,972 A | 8/1988 | Yoshida et al. |
| 4,771,268 A | 9/1988 | Sone et al. |

(Continued)

FOREIGN PATENT DOCUMENTS

EP    0 567 834 A2    11/1993

(Continued)

OTHER PUBLICATIONS

Abe et al.; "A Fuzzy Classifier with Ellipsoidal Regions", IEEE Transactions on Fuzzy Systems, vol. 5 No. 3, Aug. 1997.*

(Continued)

*Primary Examiner*—Bhavesh M Mehta
*Assistant Examiner*—John B Strege
(74) *Attorney, Agent, or Firm*—Birch, Stewart, Kolasch & Birch, LLP

(57) ABSTRACT

A system and method for translating a written document into a computer readable document by recognizing the character written on the document aim at recognizing typed or printed, especially hand-printed or handwritten characters, in the various fields of a form. Providing a pixel representation of the written document, the method allows translating a written document into a computer readable document by i) identifying at least one field into the pixel representation of the document; ii) segmenting each field so as to yield at least one segmented symbol; iii) applying a character recognition method on each segmented symbol; and iii) assigning a computer-readable code to each recognized character resulting from the character recognition method. The character recognition method includes doing a vector quantization on each segmented symbol, and doing a vector classification using a vector base. A learning base is also created based on the optimal elliptic separation method. System and method according to the present invention allow to achieve a substitution rate of near zero.

29 Claims, 6 Drawing Sheets

U.S. PATENT DOCUMENTS

| | | | |
|---|---|---|---|
| 4,876,731 A | 10/1989 | Loris et al. | |
| 4,903,312 A | 2/1990 | Sato | |
| 4,941,122 A | 7/1990 | Weideman | |
| 4,949,392 A | 8/1990 | Barski et al. | |
| 4,959,870 A | 9/1990 | Tachikawa | |
| 4,977,602 A | 12/1990 | Beato | |
| 5,034,991 A | 7/1991 | Hagimae et al. | |
| 5,054,093 A | 10/1991 | Cooper et al. | |
| 5,085,182 A | 2/1992 | Nakamura et al. | |
| 5,105,470 A * | 4/1992 | Will | 382/186 |
| 5,151,951 A | 9/1992 | Ueda et al. | |
| 5,208,869 A | 5/1993 | Holt | |
| 5,214,719 A | 5/1993 | Budd et al. | |
| 5,251,268 A | 10/1993 | Colley et al. | |
| 5,271,068 A | 12/1993 | Ueda et al. | |
| 5,276,711 A | 1/1994 | Rossi | |
| 5,303,311 A * | 4/1994 | Epting et al. | 382/197 |
| 5,319,721 A | 6/1994 | Chefalas et al. | |
| 5,438,630 A | 8/1995 | Chen et al. | |
| 5,485,531 A | 1/1996 | Ichinohe et al. | |
| 5,504,822 A | 4/1996 | Holt | |
| 5,557,689 A | 9/1996 | Huttenlocher et al. | |
| 5,572,604 A | 11/1996 | Simard | |
| 5,610,996 A | 3/1997 | Eller | |
| 5,625,708 A | 4/1997 | LeCun | |
| 5,647,022 A | 7/1997 | LeCun | |
| 5,703,963 A | 12/1997 | Kojima et al. | |
| 5,710,916 A | 1/1998 | Barbara et al. | |
| 5,727,130 A * | 3/1998 | Hung | 706/13 |
| 5,757,959 A | 5/1998 | Lopresti | |
| 5,784,485 A | 7/1998 | Xu et al. | |
| 5,787,198 A | 7/1998 | Agazzi et al. | |
| 5,802,207 A | 9/1998 | Huang | |
| 5,805,731 A | 9/1998 | Yaeger et al. | |
| 5,805,747 A * | 9/1998 | Bradford | 382/310 |
| 5,812,697 A | 9/1998 | Sakai et al. | |
| 5,812,698 A | 9/1998 | Platt et al. | |
| 5,825,925 A | 10/1998 | Baird et al. | |
| 5,832,474 A | 11/1998 | Lopresti et al. | |
| 5,835,633 A | 11/1998 | Fujisaki et al. | |
| 5,862,251 A | 1/1999 | Al-Karmi et al. | |
| 5,875,108 A | 2/1999 | Hoffberg et al. | |
| 5,901,246 A | 5/1999 | Hoffberg et al. | |
| 5,911,013 A | 6/1999 | Taniishi | |
| 5,926,564 A | 7/1999 | Kimura | |
| 5,933,525 A | 8/1999 | Makhoul et al. | |
| 5,937,093 A | 8/1999 | Takahashi | |
| 5,940,535 A | 8/1999 | Huang | |
| 5,956,419 A | 9/1999 | Kopec et al. | |
| 5,987,456 A | 11/1999 | Ravela et al. | |
| 6,021,220 A | 2/2000 | Anderholm | |
| 6,028,970 A | 2/2000 | DiPiazza et al. | |
| 6,044,171 A | 3/2000 | Polyakov et al. | |
| 6,044,174 A | 3/2000 | Sinden | |
| 6,052,481 A * | 4/2000 | Grajski et al. | 382/187 |
| 6,064,958 A | 5/2000 | Takahashi et al. | |
| 6,067,369 A | 5/2000 | Kamei | |
| 6,104,833 A | 8/2000 | Naoi et al. | |
| 6,240,209 B1 | 5/2001 | Wilcke | |
| 6,243,492 B1 | 6/2001 | Kamei | |
| 6,243,493 B1 | 6/2001 | Brown et al. | |
| 6,246,794 B1 | 6/2001 | Kagehiro et al. | |
| 6,256,408 B1 | 7/2001 | Casey et al. | |
| 6,285,786 B1 | 9/2001 | Seni et al. | |
| 6,321,232 B1 | 11/2001 | Syeda-Mahmood | |
| 6,335,986 B1 | 1/2002 | Naoi et al. | |
| 6,345,119 B1 | 2/2002 | Hotta et al. | |
| 6,351,560 B1 | 2/2002 | Hashimoto | |
| 6,356,655 B1 | 3/2002 | Sumikawa et al. | |
| 6,370,269 B1 | 4/2002 | Al-Karmi et al. | |
| 6,542,635 B1 * | 4/2003 | Hu et al. | 382/173 |

FOREIGN PATENT DOCUMENTS

WO    WO 93/18483 A1    9/1993

OTHER PUBLICATIONS

Jerome Loncelle et al.; Cooperation of GBP and LVQ Networks for Optical Character Recognition; Proceedings of the International Joint Conference on Neural Networks, Jun. 7-11, vol. 3, Jun. 7, 1992, pp. 694-699.

Anil K. Jain et al.; Statistical Pattern Recognition: A Review; IEEE Transactions on Pattern Analysis and Machine Intelligence, vol. 22, No. 1, Jan. 2000, pp. 4-37.

Teuvo Kohonen et al.; LVQ PAK: A program package for the correct application of Learning Vector Quantization algorithms, Proceedings of the International Joint Conference on Neural Networks, Jun. 7-11, pp. 725-730.

L. Simoncini et al.; A System for Reading USA Census '90 Hand-Written Fields, Document Analysis and Recognition, Proceedings of the Third International Conference on Montreal, Canada, Aug. 14, 1995, pp. 86-91.

Teuvo Kohonen; The Self-Organizing Map, Proceedings of the IEEE, vol. 78, No. 9, Sep. 1, 1990, pp. 1464-1480.

Yuuji Waizumi et al.; High Speed Rough Classification for Handwritten Characters using Hierarchical Learning Vector Quantization; Proceedings of the 4th International Conference on Document Analysis and Recognition, Aug. 18-20, 1997, Proceedings of the ICDAR, vol. II, Aug. 18, 1887, pp. 23-27.

Ching-Tang Hsieh et al., A New Generalized Learning Vector Quantization Algorithm, IEEE APCCAS 2000, 2000 IEEE Asia-Pacific Conference on Circuits and Systems, Electronic Communication Systems, IEEE APCCAS 2000, 2000 IEEE Asia-Pacific Conference on Circuits and Systems, Electronic Communication Systems, pp. 339-344.

Teuvo Kohonen, Proceeding of the IEEE, vol. 78, No. 9, Sep. 1990, pp. 1464-1480.

Ming-Kuei Hu, IEEE Transaction of Information Theory, 1962, pp. 179-186.

C.C. Hung, Proceedings of the Embedded Systems Conference East, Apr. 1994, pp. 209-220.

C.C. Hung, A1 Expert, Nov. 1993, pp. 39-49.

Thad Starner et al, "On-Line Cursive Handwriting Recognition Using Speech Recognition Methods" BBN Systems and Technologies;1994 IEEE, pp. V-125-V-128.

James M. Sibigtroth, "Fuzzy Logic Provides a Solid Numerical Basis for Handling Expert Knowledge—Now It Can Be Applied To A Microcontroller-based System", AI Expert, Apr. 1992, pp. 25-31.

Ching Y. Suen et al., "Automatic Recognition of Handprinted Characters—The State of the Art", 1980 IEEE, pp. 469-487.

* cited by examiner

FIG. 3

| COUNTRY | ISO 4217 | EXCHANGE | CONVERTED |
|---|---|---|---|
| AUSTRALIA | AUD | 0.5610 | 1.7835 |
| BRAZIL | BRL | 0.2648 | 3.7764 |
| CANADA | CAD | 0.6428 | 1.5557 |
| CHINA | CNY | 0.1208 | 8.2781 |
| DENMARK | DKK | 0.1358 | 7.3638 |
| GREAT BRITAIN | GBP | 1.5746 | 0.6351 |
| HONG KONG | HKD | 0.1282 | 7.8003 |
| INDIA | IDR | 0.0208 | 48.0767 |
| JAPAN | JPY | 0.0081 | 123.4760 |
| MEXICO | MXP | 0.0983 | 10.1729 |
| NORWAY | NOK | 0.1372 | 7.2886 |
| RUSSIA | RUR | 0.0314 | 31.8603 |
| SINGAPORE | SGD | 0.5676 | 1.7618 |
| SWEDEN | SEK | 0.1109 | 9.0171 |
| SWITZERLAND | CHF | 0.6841 | 1.4618 |
| UNITED STATES | USD | 1.0000 | 1.0000 |

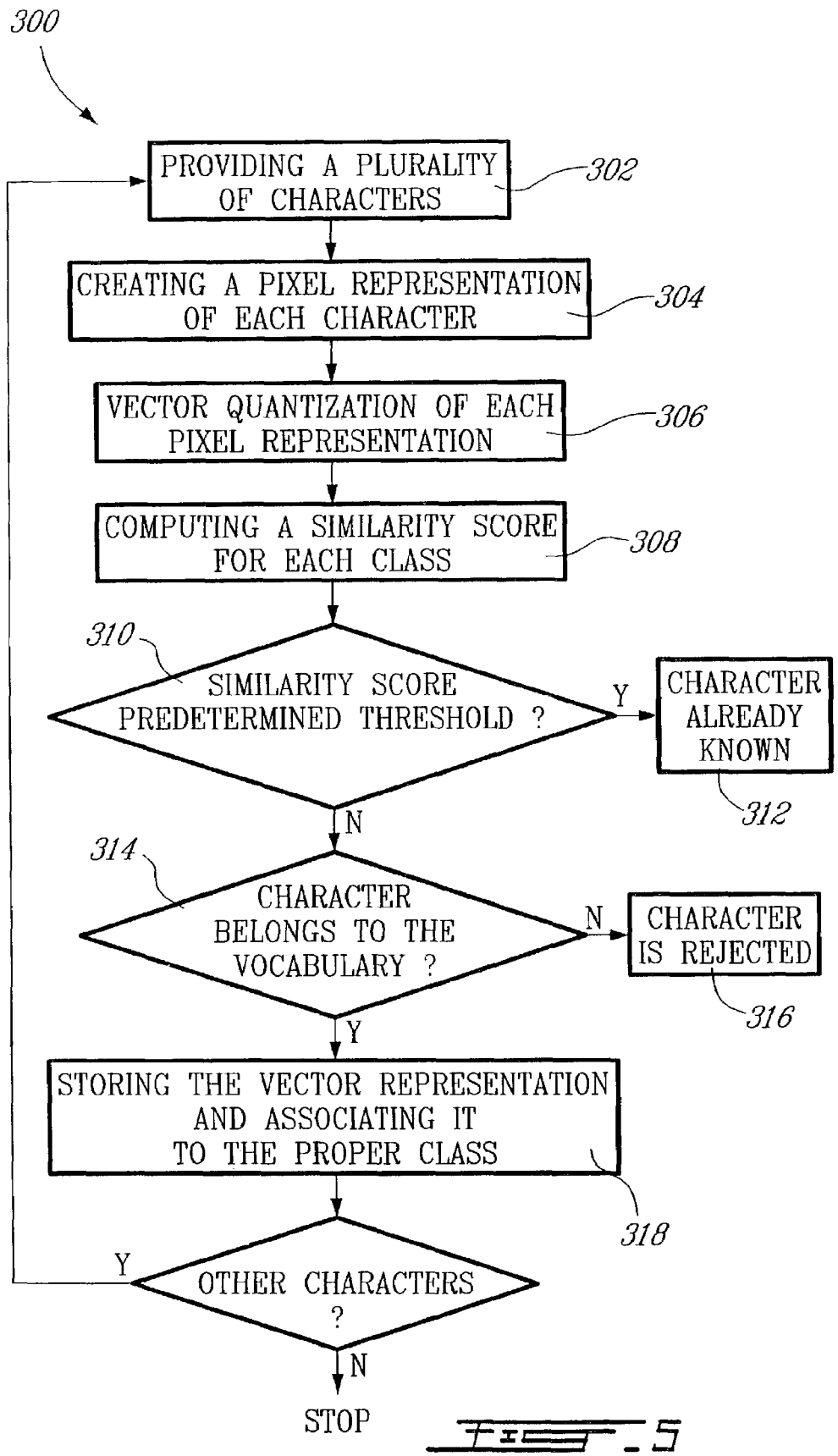

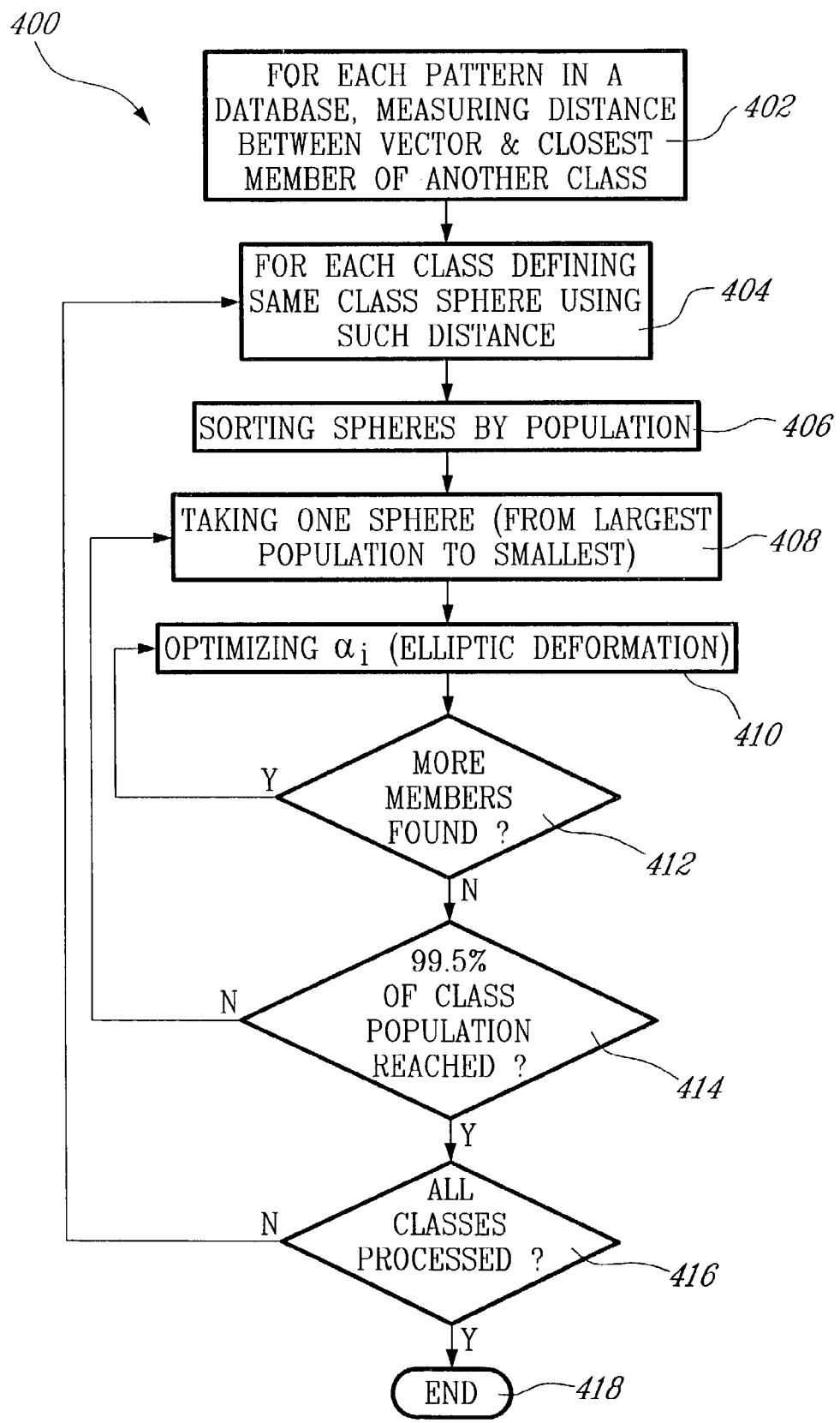

CHARACTER RECOGNITION SYSTEM AND METHOD

This nonprovisional application claims priority under 35 U.S.C. § 119(a) on patent application No. 2,375,355 filed in Canada on Mar. 11, 2002, which is herein incorporated by reference.

FIELD OF THE INVENTION

The present invention relates to character and pattern recognition systems and methods.

BACKGROUND OF THE INVENTION

Most of known optical character recognition (OCR) methods start with a pre segmentation stage in which part of a digitized document is first segmented (isolated) into individual symbols, words and/or characters, followed by a character recognition step to translate these symbols, words and/or characters into pre-determined computer-readable entities.

A template-based Optical Character Recognition (OCR) method which does not require pre-segmentation has been suggested by Levin et al. in the International Application No. WO93/18483 published on Sep. 16, 1993, and entitled "Method and Apparatus for Image Recognition". A drawback of this method is that it has difficulty recognizing patterns because of intra-class variability of the patterns.

As it is well-known in the art, each character which needs to be recognized is considered to be a different class.

The recognition of a character includes the characterization of their features or patterns. While there are generally different views on the definition of the features of patterns, many studies made on the recognition of characters as well as on the recognition of patterns have shown that the so-called quasi-topological features of a character or pattern such as the concavity, loop, and connectivity are key features for the recognition. To date, many different methods have been proposed for the purpose of extracting such features. For example, some of these methods use analysis of the progressive slopes of the black pixels.

On-line handwriting recognition systems have been designed which compute feature vectors as functions of time. An example of such systems is described in T. Starner, J. Makhoul, R. Schwartz and G. Chou; "On-Line Cursive Handwriting Recognition Using Speech Recognition Methods; IEEE International Conference on Acoustics, Speech, and Signal Processing, Adelaide, Australia, Apr. 19-22, 1994, Vol. V. pp. 125-128. However, on-line handwriting recognitions systems are not suitable for OCR applications since these applications are faced with the problem of recognizing a whole page of text which presents a two-dimensional problem for which there is no obvious way of defining a feature vector as a function of one independent variable.

U.S. Pat. No. 5,727,130, issued to Hung on Mar. 10, 1998 and entitled "Genetic Algorithm For Constructing And Tuning Logic System" describes the use of a fuzzy logic system for OCR. "Fuzzy Logic" was developed to enable data processors based on binary logic to provide an answer between "yes" and "no." Fuzzy logic is a logic system which has membership functions with fuzzy boundaries. Membership functions translate subjective expressions, such as "temperature is warm," into a value which typical data processors can recognize. A label such as "warm" is used to identify a range of input values whose boundaries are not points at which the label is true on one side and false on the other side. Rather, in a system which implements fuzzy logic, the boundaries of the membership functions gradually change and may overlap a boundary of an adjacent membership set. Therefore, a degree of membership is typically assigned to an input value. For example, given two membership functions over a range of temperatures, an input temperature may fall in the overlapping areas of both the functions labelled "cool" and "warm." Further processing would then be required to determine a degree of membership in each of the membership functions.

Fuzzy logic control systems have become increasingly popular in practical applications. Traditionally, the design of the knowledge base including membership functions and rules relies on a subjective human "rule-of-thumb" approach for decision-making. In addition, the control system is adapted (tuned) to the desired performance through trial and error. As a result, designing and adapting the fuzzy logic control system becomes a time-consuming task. To overcome this drawback, neural network techniques have been used in assisting designers to generate rules and adapt the fuzzy logic control system automatically.

A fuzzy logic system is inherently well-suited for dealing with imprecise data such as handwritten character and processing rules in parallel. However, the actual implementation of fuzzy rule-based systems for this type of application often relies on a substantial amount of heuristic observation to express the knowledge of the system. In addition, it is not easy to design an optimal fuzzy system to capture the necessary features of each character.

Typically, one rule is used to recognize one character, and each character is represented as one consequent of a rule. The actual implementation of fuzzy rule-based systems for this type of application often relies on a substantial amount of heuristic observation to express the membership functions for the antecedents of each rule. Each rule consists of several antecedents and consequents depending on the number of inputs and outputs, respectfully. Each antecedent in a given rule is defined as an input membership function, and each consequent is defined as an output membership function.

Neural networks consist of highly interconnected processing units that can learn and globally estimate input-output functions in a parallel-distribution framework. Fuzzy logic system store and process rules that output fuzzy sets associated with input fuzzy sets in parallel. The similar parallelism properties of neural nets and fuzzy logic systems have lead to their integration in studies of the behaviour of highly complex systems.

The process of designing a fuzzy rule-based system is tedious and critical for the success of the recognition. It must be done as efficiently and accurately as possible if it is to sufficiently address the OCR problem.

However, the output of Neural networks is dependent on the exact sequence of <<learning>> of the knowledge base. If the same knowledge base is fed twice to a neural Network with only one substitution in the learning sequence, the end result will be different in each case. This can be a major disadvantage for any OCR system.

In the U.S. Pat. No. 5,727,130, Hung describes the use of Learning Vector Quantization ("LVQ"). LVQ, which is well-known in the art, accomplishes learning by placing input data in a finite number of known classes. The result is that this method provides the supervised effect of learning and enhances the classification accuracy of input patterns. It is also independent of the learning sequence.

It is desirable to design more robust input membership functions that correspond to a rule. The linguistic term of a rule's antecedent, such as "input 1 is small", depends upon how accurately the input space is qualified while defining membership functions. LVQ can group similar input data into the same class by adjusting the connection weights between the inputs and their corresponding output. In other words, through supervised learning, the features of each class can be extracted from its associated inputs.

Hence, a learning vector quantization neural network may be used to optimize the features of each handwritten character. Ming-Kuei Hu, in "Visual Pattern Recognition Moment Invariant," IEEE Transaction on Information Theory, pp. 179-186, 1962, describes such a system. A LVQ network, is also disclosed in Teuvo Kohonen, "The Self-Organizing Map," Proceeding of the IEEE, Vol. 78, No. 9, pp. 1364-1479, September 1990.

A LVQ learning system can be seen as a two-layered network. The first layer is the input layer; the second is the competitive layer, which is organized as a two-dimensional grid. All units (a "unit" is represented as one input variable, such as $x_1$, of one input pattern $(x_1, x_2, \ldots)$) from the first layer to the second are fully interconnected. In the OCR example, the units of the second layer are grouped into classes, each of which pertains to one character. For purposes of training, an input pattern consists of the values of each input variable and its corresponding class (i.e. the character that it represents). A quantization unit in the competitive layer has an associated vector comprising the values of each interconnection from all the units in the input layer to itself. This vector implicitly defines an ideal form of character within a given class.

The LVQ learning system determines the class borders using a nearest-neighbour method. This method computes the smallest distance between the input vector X: $(x_1, x_2, \ldots x_n)$ and each quantization vector. In known systems, this computation is done in terms of Euclidean distance (straight line distance in multi-dimensional space).

Input vector X belongs to class C(x), and quantization vector w(I) belongs to class C(w). If C(x) and C(w) belong to different classes, the w(I) is pulled away from the class border to increase the classification accuracy. If C(x) and C(w) have the same class, the w(I) closes to the center of the class. Then each input pattern is presented sequentially in the input layer and several iterations. The weights of the quantization units in each class are fine-tuned to group around the center of the class. Therefore, the weight vector of the center unit within the class is represented as the optimum classification for the corresponding class. The result of the LVQ learning process is an optimized vector for each alphanumeric character.

U.S. Pat. No. 5,832,474, entitled "Document Search And Retrieval System With Partial Match Searching Of User-Drawn Annotations" and issued to Lopresti et al. on Nov. 3, 1998 also describes the use of vector quantization in a document search and retrieval system that does not require the recognition of individual characters.

However, most of the prior art character recognition systems are based on the concept of seeking to classify the greatest number of characters as possible. This means that such systems seek to attribute each character to be recognized to a class even if a certain degree of "guesswork" is necessary. As a result, such systems are far from being sufficiently accurate for many applications.

A specific example of a LVQ learning system is the optimal linear separation. It can be described summarily as follows:

each class vector has important dimensions (from 100 to 350 components);

for each pair of classes it is possible to find an hyper plan allowing to separate them. In the case of N classes, they are separated two by two by N (N−1)/2 hyperplans. The equation of each hyperplan is simple:

$$S(\alpha i\ xi)=0.$$

Therefore, for all members of class A, $S(\alpha i\ xi)>0$ and for all members of class B, $S(\alpha i\ xi)<0$. By the use of a simple algorithm, the various coefficients $\alpha i$ converge toward the most efficient value. This known system can be useful when used with characters which are very close to those in the database. This is the case, for example, of typed characters.

However, it has drawbacks, the most important of which is the difficulty to find a hyperplan to separate very complex objects such as hand-printed characters. Because a plan is by definition open ended, it is difficult to reject characters which are relatively distanced from the characters which are sought to be read (commas, exclamation marks, question marks, etc . . . ).

Multi-layer perceptron is a well known application of neural networks. This method can be excellent if great care is used in the training phase. However, because no theoretical base exist to improve the result in a structured way, one must rely on trial and error processes which are extremely costly. As a result, if the multi-layer perceptron system is "taught" the same data twice, two different results will be obtained.

Very often, it is impossible to be 100% certain that the character which was read is in reality the digital representation which was assigned to such character by the recognition method. Therefore, it is advantageous to establish a measure of confidence in the accuracy of the recognition method. The confusion rate is defined as the number of characters which were thought to have been recognized but were in fact wrongly recognized divided by the total number of characters read. The rejection rate is the number of characters which the recognition method has failed to recognize over the total number of characters read. The read rate consists in the total number of characters that were accurately read over the total number of characters read. Therefore, the read rate plus the confusion rate plus the rejection rate should equal 100%.

In many applications, it is preferable to consider a character to be unrecognizable even if it is one of the ASCII characters that the system is seeking to recognize than to assign a wrong ASCII value to the character which was read. This is especially the case in financial applications.

This being said, the read rate has to be high enough for the recognition system to be worthwhile. Therefore, the ideal system is the one in which the confusion rate is zero and the read rate is as close as possible to perfect. Limiting factors for the read rate include:

poor quality images including poor contrast images caused by the use of a low quality writing instrument or a color that is not easy to digitize;

an image that is poorly recognized by the digitizing sub-system or the presence of a background image;

a poor definition of the zone in which the characters are to be written; and printed characters that extend outside the area reserved for the field which can include characters which are too large, character that are patched together or open characters.

Poor class separation performance may also result from the quality or quantity of the vector examples in the vector database or the inability of the recognition engine to generalize. Indeed, hand-printed documents are by definition nearly never identical from one person to the next or from one expression to the next even when written by the same person.

SUMMARY OF THE INVENTION

In accordance with a first aspect of present invention, there is provided a method for translating a written document into a computer readable document comprising:
  providing a pixel representation of the written document;
  identifying at least one field into the pixel representation of the written document;
  segmenting each the at least one field, yielding at least one segmented symbol;
  applying a character recognition method on each segmented symbol; and
  assigning a computer-readable code to each recognized character resulting from the character recognition method.

More specifically, in accordance with a second aspect of the present invention, a method for recognizing a character corresponding to a written symbol, comprising:
  providing a pixel representation of the written symbol;
  segmenting the pixel representation, yielding a segmented symbol;
  doing a vector quantization on the segmented symbol, yielding a vector representation of the symbol;
  for possible class(i), i ranging from 1 to N, N being the number of different possible classes:
  providing a vector representation(i) for each class(i);
  computing a similarity score(i) using the vector representation (i) of the symbol and the vector representation for class(i); and
  comparing the similarity score(i) to a threshold(i); and
  if only one of the similarity score(x) is superior than the corresponding threshold(x), x ranging form 1 to N: and
  assigning to the written symbol a computer-readable code corresponding to the class(x) is provided.

In accordance with a third aspect of the present invention, a method for creating a vector base for a character recognition method comprising:
  for each of a plurality of characters(i), i ranging from 1 to N, N being the number of characters;
  providing a pixel representation (i)
  doing a vector quantization on each pixel representation (i), yielding a vector representation (i) for each pixel representation (i);
  computing a similarity score (x) for each of a plurality of predetermined classes, x ranging from 1 to M, M being the number of predetermined classes, by comparing the vector representation (i) of each pixel representation to a provided vector quantization (x) corresponding to the each of a plurality of predetermined class;
  a) if, for one of the plurality of predetermined classes (x), the similarity score(x) is superior to a predetermined threshold(x), the character (i) being considered already known;
  b) if not, verifying if the character (i) belongs to one of the classes (x);
    i. if no, the character (i) is rejected;
  if yes, the character (i) is associated to the corresponding class (x) is provided.

In accordance with a fourth aspect of the present invention, there is also provided a character recognition learning method comprising:
  providing a database of recognized characters; each recognized characters belonging to a class and being represented by a quantization vector; the number of different classes being C;
  for each recognized character (i) in the database, measuring a distance(i) between a first quantization vector representing the each recognized character(i) and a second quantization vector representing a character from another class; the second quantization vector having the shortest distance (i) with the first quantization vector among all quantization vectors representing characters from a class different than the class to which the each character (i) belongs; and
  for each class(j), j ranging from 1 to C:
    for a predetermined number of recognized character(k) member of class(j):
      defining a same class sphere(k) comprising only quantization vectors which are members of class (j) and having a distance with the quantization vectors(k) less than distance(k); and
      determining a number(k) of quantization vectors representing a character from class(j) and being part of same class sphere(k);
      for each same class sphere(k), from the same class sphere having the largest number(k) to the same class sphere having the smallest number(k), applying an elliptic deformation until members of other classes are reached, yielding an optimized quantization vector for class(k).

Finally, in accordance with a fifth aspect of the present invention, there is a provided a system for translating a written document into a computer-readable document:
  a document digitizer for creating a pixel representation of the document;
  a controller coupled to the digitizer for:
  receiving the pixel representation of the document;
  identifying at least one field in the pixel representation of the document;
  segmenting each the at least one field, yielding at least one segmented symbol for each the at least one field;
  applying a character recognition method on each segmented symbol; and
  assigning a computer-readable code to each recognized character resulting from the character recognition method;
  an output device coupled to the controller for displaying segmented symbols, from the at least one segmented symbol, unrecognized by the character recognition method; and
  at least one input device coupled to the controller for entering a computer-readable code of humanly recognized character among displayed segmented symbols.

Methods and systems according to the present invention have the following desirable characteristics and features:
  It allows to reduce the confusion rate near zero.
  It aims at recognizing typed or printed, especially hand-printed or handwritten characters, in the various fields of a form;
  It aims at picking out well known alphanumeric characters from an image which includes a great many patterns of types not previously taught to the machine: this is made possible since measurements of unknown shapes advantageously have high correlation with previously taught shapes before they are even considered;
  It allows to achieve a substitution rate (the percentage of wrongly chosen class names divided by the number of class names correctly chosen by a human judge working from only the same images) of near zero; and It is adaptive in the sense that it can learn previously unknown patterns and automatically generate new recognition equations which are carefully crafted to be non conflicting with previously learned patterns. Typically the manual operator will provide a correct classification for a rejected character; non supervised learning can also take place, e.g., learning using an automatic dictionary.

Even though the present invention is described herein referring generally to character recognition, the expression "character" should be construed as including any written symbols or shapes, including but not limiting to letters (in any alphabet), numbers, etc.

Other objects, advantages and features of the present invention will become more apparent upon reading the following non restrictive description of preferred embodiments thereof, given by way of example only with reference to the accompanying drawings.

BRIEF DESCRIPTION OF THE DRAWINGS

In the appended drawings:

FIG. 3 is a bitmap representation of the document illustrated in FIG. 1, illustrating the separation of the document into fields;

FIG. 5 is a flowchart illustrating a method of creation of a vector base, according to an embodiment of a fourth aspect of the present invention; and FIG. 6 is a flowchart illustrating a learning method according to an embodiment of a fifth aspect of the present invention.

DESCRIPTION OF THE PREFERRED EMBODIMENT

Figure 1:
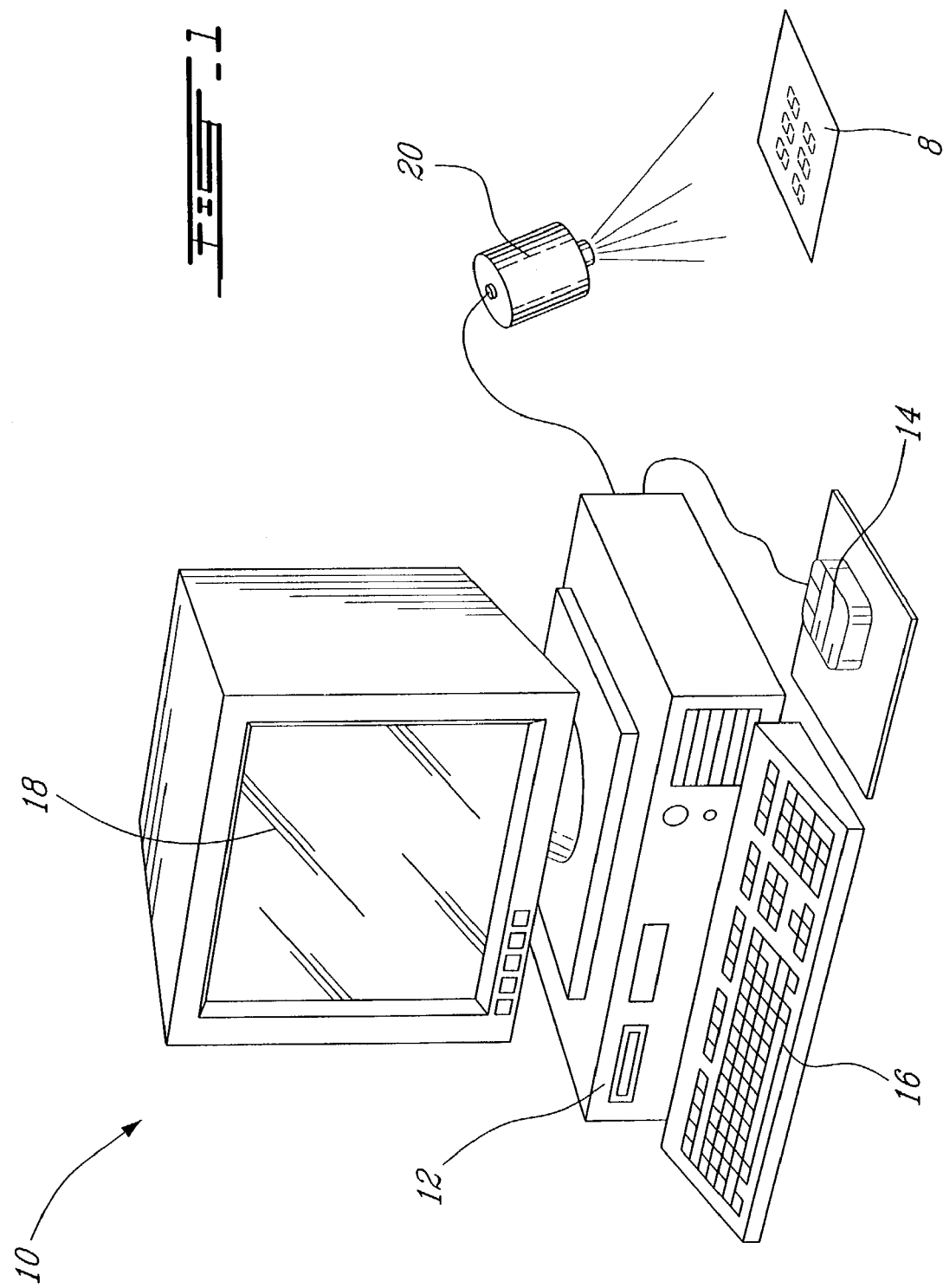
FIG. 1 is a perspective view of a system for translating a written document into a computer readable document according to an embodiment of a first aspect of the present invention.

Turning now to FIG. 1 of the appended drawings, a system 10 for translating a written document 8 into a computer readable document according to an embodiment of a first aspect of the present invention will be described.

The system 10 comprises a controller 12, input devices such as a pointing device 14 and a keyboard 16, a display device 18, a document digitizer 20, and a storing device (not shown).

The input devices 14 and 16, and display device 18 are coupled to the controller 12 through conventional coupling means.

The display device 18 and input devices 14 and 16 are optional but may allow a system operator to perform the verification of unrecognized characters as will be explained hereinbelow in more detail.

The display device 18 is in the form of a computer monitor, but may alternatively be in the form of a liquid crystal display or of any device that allows display of digitized printed character or of the actual printed or handwritten characters as found on the document.

According to an embodiment of the present invention, the pointing device 14 is in the form of a computer mouse. Of course, a single input device may be used to operate the system 10 depending on the user interface programmed in the controller 12.

The document digitizer 20 includes an optical reader allowing to image at least part of the document 8 and to create a pixel or bitmap representation thereof. Of course, the document digitizer 20 is configured so as to transform the image of document 8 into a binary document. Means for achieving this transformation may be included in the controller 12, for example in the form of a digitization module, or part of a device that includes the optical reader.

Although a conventional scanner may be used, commercial applications may require the use of both a camera, such as a CCD (charge-coupled device) camera, and a dedicated processing power of the controller 12.

The controller 12 is advantageously in the form of a computer. The controller 12 may alternatively take many forms such as an electronic control circuit or a programmed chip.

The storing device (not shown) may take many form including: a disk, cdrw, or dvd drive, a hard disk, memory card, computer RAM (Read Only Memory), etc. The storing device may be included in the controller, or be embodied in a device (not shown) coupled to the controller 12.

The controller 12 is advantageously programmed so as to embody a method 100 for translating a written document 8 into a computer readable document according to an embodiment of a second aspect of the present invention, as will now be described with reference to FIG. 2.

The method 100 comprises the following steps:
110—Digitization of the document to be translated;
120—Recognition of the type of document;
130—Separation of the document into fields;
140—Recognition of each character in the field;
150—Verification of the recognized characters;
160—Human verification of unrecognized characters;
170—Quality control; and
180—Formatting of the resulting translated document.

Each of these general steps will now be described in more detail.

In step 110, the written document 8 to be translated into a computer-readable file is digitized using the system 10 and more specifically the digitizing device 20. The result of the digitization step 110 is a pixel representation 22 of the document to be translated, which is exemplified in FIG. 3.

The pixel representation 22 of the document may be either stored into the storing device (not shown) for later processing or be made available to the controller 12 for further processing.

Since digitization methods, applications and modules are believed to be well known in the art, they will not be described herein in more detail.

Alternatively to the digitization step 110, a pixel representation of the document may be provided to the controller 12. This pixel representation may result from a prior independent segmentation process.

In step 120 the type of document is determined. This step is optional, but allow to facilitate the next step (130) which is the separation of the digitized document 22 into fields 24 in those cases where many different types of documents may be read by the system 10.

Indeed, since the separation into field depends on the format of the document 8, it is preferable to pre-determined the type of document.

Step 120 is achieved on the digitized document by identifying certain characteristics such as markings or a configuration that is expected for a pre-determined type of documents. Of course, the nature and characteristics of those markings or configuration are pre-determined and stored, for example in the controller 12, to be used in step 120. Examples of characteristics that can be used to identify a document type include: text block, dimension, lines.

Alternatively, the type of document is recognized by the operator and inputted in the controller.

In step 130, the document is then separated into fields 24 (see FIG. 3).

A field is a generally rectangular section of the document known to include predetermined information coded as a one or more characters. For example, on a bank related document, a bank account identifier is to be found in a predetermined portion of the document that includes characters identifying the account.

Different fields in a document may have different sizes. Alternatively, a field may have a different shape then a rectangle. Of course, in those cases, the segmentation algorithm (first sub-step of step 140) has to be adapted to the specific shape of the field.

The identification of fields in the pixel representation 22 of the document 8 is advantageous since, in most applications, one does not have to read every characters on the document 8. It is therefore more efficient (both time and money wise) to concentrate the character recognition process on fields having relevant information.

The result of step 130 is a rectangular bitmap (see 24 on FIG. 3).

In step 140, the information in each field 24 is extracted. More specifically, the bitmap information 24 in an identified field (step 130) is translated into a predetermined computer-readable format such as ASCII or EBCDIC.

Of course the number of characters included in a field may vary and in some cases a field may include only one character.

Step 140 includes the following two substeps:
The segmentation of the field so as to separate the bitmap representations of characters 26 in the field 24 from one another In other words, the different shapes or symbols in a field are discriminated; and
Using each segment 26 in a field, to identify a character from a list of possible characters (see method 200, FIG. 4), so as to represent the identified character by a value in a predetermined computer-readable format (or digital representation), such as ASCII.

Regarding the segmentation substep, it is to be noted that the segmentation method used takes into account the fact that size of the bitmap representation 26 of a character can vary considerably from one character to another and, in the field 24 including handwritten characters, from one writer to another.

Since segmentation methods are believed to be well known in the art, and for concision purposes, such methods will not be described herein in more detail.

Character Recognition

The next substep of step 140 concerns the actual character recognition. This operation seeks to associate a given digital character to each character image (symbol) 26 defined during the segmentation substep. A similarity score is associated to each predetermined possibility among the list of possible digital characters. This operation presumes that each discriminated symbol resulting from the segmented process is the image of a single character.

Figure 4:
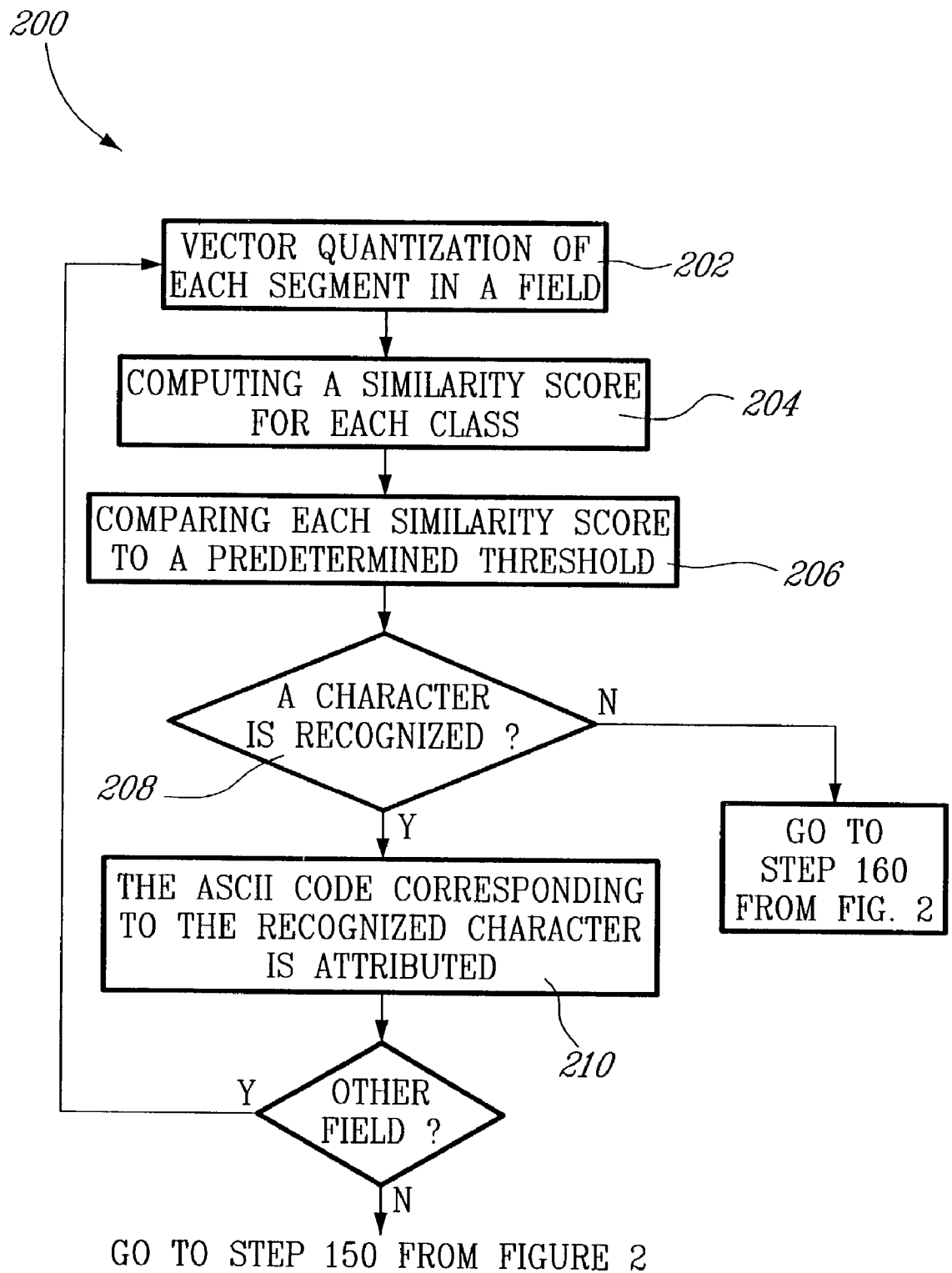
FIG. 4 is a flowchart illustrating a method for character recognition according to an embodiment of a third aspect of the present invention.

Turning now to FIG. 4, a method 200 for character recognition according to an embodiment of third aspect of the present invention is illustrated.

The character recognition method 200 is determined and characterized by the following choices:
a vector quantization method;
a vector classification/separation method;
the determination of valid digital characters or "vocabulary" chosen among a computer readable model (for example ASCII); and
the creation of a vector base.

The character recognition method per se includes two substeps: the vector quantization (substep 202), and the vector classification (substeps 204-210). Substeps 204-210 are done using a vector base as will be explained herein in more detail.

Regarding substep 202, as it is well known in the art, a quantization vector is a mathematical representation including many components, each describing a characteristic of symbol or shape to be analyzed. These vectorial representations allow to recognize a character from a visually non-ambiguous shape. Many quantization vectors are known and can be used in the character recognition method according to the present invention. Substep 202 therefore yields a mathematical representation of each segmented bitmap character representations. Of course, the same quantization model has to be used for the character recognition process and for the vector base definition process.

In substep 204, a similarity score is computed by comparing the vector quantization of the current character to be recognized and predetermined vector quantization of each possible output among the possible predetermined valid characters computed with the same model. According to a most preferred embodiment of the present invention, the comparison is achieved using an optimal spherical separation method as will be described hereinbelow with reference to the learning process.

Alternatively, other separation method, such as the optimal linear separation method (LDC) or a multi layer perceptron (MLP) method briefly described hereinabove or one of the following method may also be used:
SVM (Support Vector Machine);
QDF (Quadratic Discriminant Function);
MQDF (Modified Quadratic Discriminant Function);
KNN (K Nearest Neighbour).

Since these separation methods are believed to be well known in the art, and for concision purposes, these methods will not be described herein in more detail.

In substep 206, the similarity score for each class is compared to a predetermined threshold.

The threshold is a function of scores which result from the learning base, and of the predetermined acceptable error rate. For example, if one notice that the characters "3" and "9" are confounded with scores of 0.5, thresholds should be increased above 0.5 for each character.

The comparison process consists in verifying if the vector characterisation of the current character to be recognized is close enough to one of the members populating each classes (each character which needs to be recognized is considered to be a different class).

Figure 2:
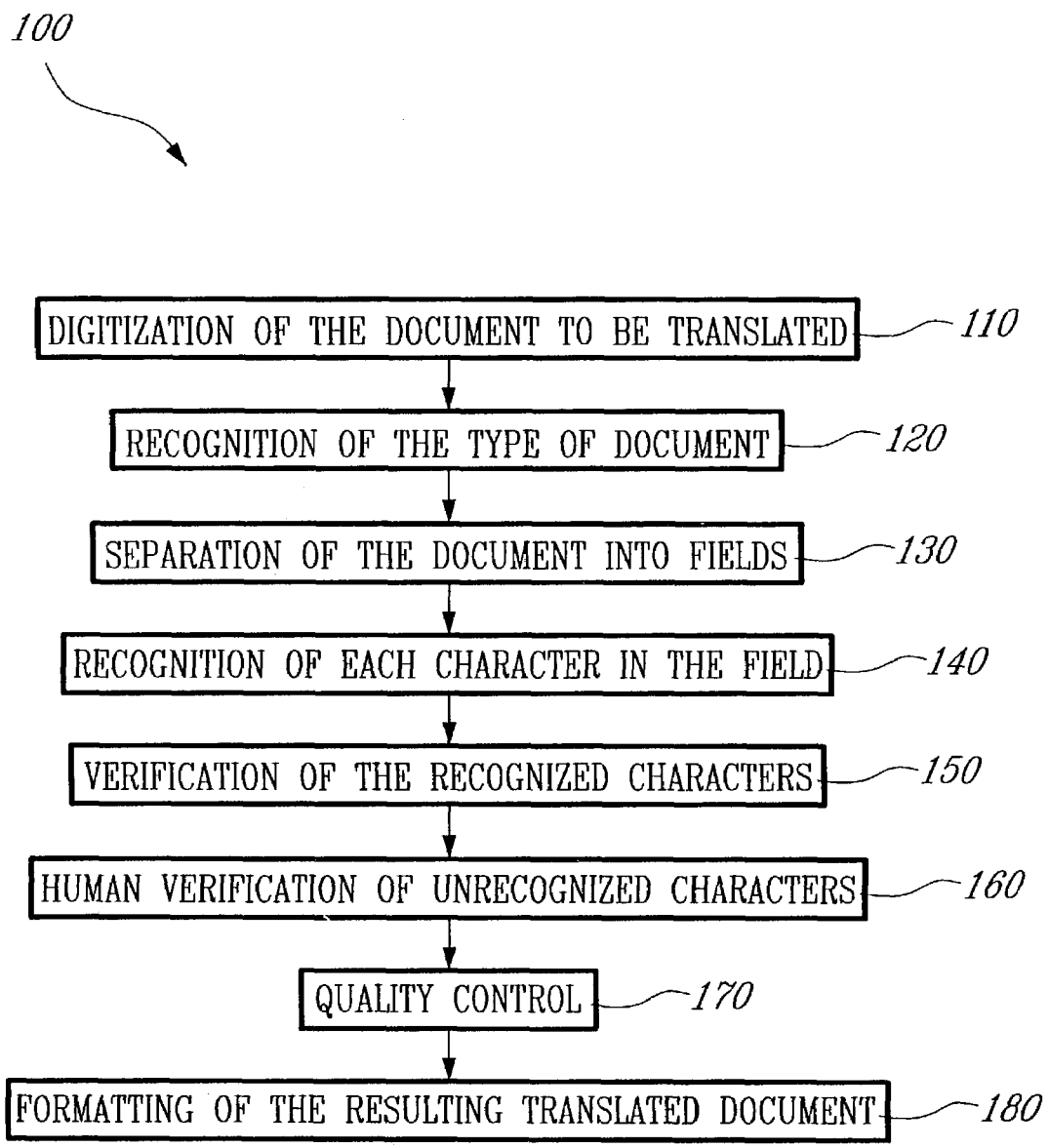
FIG. 2 is a flowchart illustrating a method for translating a written document into a computer readable document according to an embodiment of a second aspect the present invention.

If the similarity score has not reached the threshold or if more then one class threshold are reached (step 208), the character is not recognized and the method returns to the human inspection step (step 160 from FIG. 2).

If not, the ASCII code corresponding to the recognized character class is attributed (substep 210), and the method proceeds with the next segmented bitmap 26 (also called pixel cluster) representation in the current field 24.

After all the pixel clusters 26 of a field 24 have been processed, the method proceeds with the verification of the character (step 150 from FIG. 2).

It is to be noted that the use of an optimal elliptic separation method to pre-determine each class population allows to minimized the simultaneous reach of two different classes threshold.

As will be described hereinbelow in more detail, the resulted vectors are then classified or separated into a number of classes each corresponding to one shape which is sought to be recognised. Each such shape is usually one of the characters in the universe of valid characters in the application. However, it may also be useful to include vectors relating to frequently used invalid characters or marks, such as alphabetic characters in a numeric field or a minus sign.

It is to be noted that the character recognition method and system is preferably optimized for a specific use. For example, if the field to be recognized is a numeric field, the class separation will be optimized to produce a digit from zero to nine and to exclude all others. In such an example, there are ten distinct outputs, each being associated with a similarity score as will be described hereinbelow. Then, the different outputs and their associated scores are sorted by decreasing similarity scores. In those cases where one output does not have a similarity score which is high enough to determine the "winning" character, further processing is required. These steps will be described hereinbelow in more detail.

Different character recognition methods may be used for translating a single document. For example, different recognition method may be specifically assigned for different types of field (numeric, alphabetical or other). A character recognition method may comprise a number of recognition engines each being composed of a particular vector quantization and a class separation method as well as a voting method allowing the combination of the results of the various recognition engines using simple averages, weighted averages or veto rules.

After the character recognition step (140), the method 100 proceeds, in step 150, with the verification of the recognized characters. This step consists in verifying the character obtained in step 140 by applying pre-determined field validity rules (for example the algorithm or key to validate a bank account number or a social security number). Of course, depending on the type of document, other verification process may alternatively be used such as:

Verification in a stored database;
Predetermined rule; and
Verification in a thesaurus.

Alternatively, the verification step may consist in further deciding if the level of confidence on the character found is high enough to be considered recognized, or should the method 100 proceeds with the next step (160).

Also, the verification step 150 may consist in better assessing the class of the character to be identified by analyzing it in the context of its neighbor characters. For example, in the case where the character is expected to be a letter part of a word, an ICR (Intelligence Character Recognition) module, advantageously included in the computer 12, may be used to identify the word and thereby the letters forming it. Since, ICR module are believed to be well known in the art, they will not be discussed herein in more detail.

Then, in step 160, unrecognized characters are verified by the operator of the system 10.

The operator reviews each field for which no similarity score is higher then the predetermined thresholds, and also, optionally those fields not corresponding to managing rules predetermined for the identified type of document.

Step 160 allows the operator to input any missing information following the automatic character recognition process. It is to be noted that this step allows also to correct errors resulting from the original input by a person.

A quality control is then optionally executed in step 170.

This step includes sampling some of the resulting recognized characters, and the operator visually verifying their validity by comparison with the corresponding initial character on the document 8.

Of course the sampling rate may vary depending on the application and the desired success rate. Also, the sampled characters may be chosen randomly or systematically.

Finally, in step 180, the computer-readable codes that have been assigned to the recognized characters (humanly or resulting from the character recognition method) are assembled an formatted so as to be displayed or stored for later display.

Of course, only one or some of the recognized characters may be formatted and/or displayed in step 180.

Creation of a Vector Base

As discussed hereinabove, the vector base is a database including a plurality of quantization vector for each given class. A learning process is used to create or to add to a base of vectors of known specimens of the vocabulary, each assigned to a given class. A method of creation of a vector base will be described in more detail hereinbelow.

The method of creation of a vector base 300 according to an embodiment of a fourth aspect of the present invention is illustrated in FIG. 5.

In step 302 a plurality of characters or shapes are provided.

A bitmap (pixel) representation of each character or shape is then created in step 304.

This bitmap representation is then passed through the predetermined vector quantization method (step 306).

A similarity score, similar to those described for the character recognition method 200, is then assigned for the character in respect of all classes (308). If the similarity score exceeds a predetermined threshold (310) it means the character is already known and can thus be ignored (312). If not, it is examined by an operator of the system 10 to determine if it belongs to the desired vocabulary (314). If not, it is rejected (316). If it belongs to the vocabulary, the current vector representation is stored to be added to the vector base and associated to the proper class (318) as assigned by the operator.

This last threshold is determined through experimentation and depends on the expected success rate. Indeed, a high threshold should be used to obtain a highly precise table, at the risk of rejecting numerous elements and of adding elements already present in the table.

It has been found that generally, a character having a similarity score above 0.8 when comparing to a class should be considered part of that class and therefore recognized, and a character with a similarity score below 0.04 should be considered invalid. Between these two thresholds, the choice belong to the operator.

Learning Process

There follows a learning process (see FIG. 6) that comprises a series of iterative adjustments of network coefficient to optimize the performance of the recognition engine.

These network coefficients are related to the quantization vector components for each characters.

As will become more apparent upon reading the following description, it can thus be seen that the recognition engine so created cannot provide other results than the classes for which it was built.

The learning process 400 is completed as described in FIG. 5. The learning process described hereinbelow is based on the optimal elliptic separation method.

The learning process is as follows.

For each pattern in a database, the shortest distance between the quantization vector representing the pattern and the closest quantization vector of another class is measured (402). Many well-known mathematical methods may be used to compute the distance between these two vectors.

This distance is then used to define, for each class, a sphere which will comprise only vectors which are members of the same class (404). Therefore, the closed surface formed by this sphere separates all the members of the class contained in the sphere from all other classes. The number of same class vectors contained in the sphere is determined and the database is sorted using such number (from the largest to the smallest) (406).

Each N-dimension sphere (starting by the one containing the largest number of members) (408) is then deformed into a N-dimension ellipsoid, N being the size of the quantization vector until the optimization process is completed (410) through an iterative process as follows:

having $\Sigma(\alpha_i x_i^2) = 0$, which is the equation of an N-dimension sphere, one tries to find the optimal $\alpha_i$ coefficients;

i ranging from 1 to N; and $x_i$ representing the axis of the sphere in all each dimensions.

It has been found that by using elliptical separation class members can be regrouped more efficiently.

Reading hand-printed characters are particularly difficult because it is impossible to ever have a database of vectors representing every possible variation in handwritten characters. However, the use of the optimal elliptical separation method considerably reduces the negative impact resulting from the use of "incomplete" vector databases. However, by searching all the various ellipsoids and retaining all of those which may relate to the proposed character and by assigning a similarity score, it is possible to "learn" where the character belongs and make the appropriate adjustments to the various ellipsoids.

One way to assign a score to each particular member of an ellipsoid is to attribute a score of zero if the given character is located at the perimeter of the ellipsoid while attributing a score of one if such character is located at its "centre". The appropriate scoring equation is:

$1 - \exp{-\Sigma(\alpha_i X_i^2)}$.

The equation for an hyper ellipses is the following:

$\Sigma(\alpha_i X_i^2) = 0$.

Optimization is used in order to find the optimal $\alpha_I$ coefficient.

At first, all $\alpha_i$ coefficients are set to 1, except for the constant $\alpha_0$ which is set to 1. $\alpha_0$ represents is the square of the radius of the sphere.

Following the first iterations, as soon as the space is separable, the learning base is re-examined to add all characters from the corresponding class that fit within the ellipsoid.

An algorithm similar to those used for the well known hyperplan separation method is used to optimize the separation between the various members contained in the ellipsoid from all others. Alternatively, other optimisation algorithm can be used. The ellipsoid is deformed until members of other classes are reached (step 412). The result is the best vector available because more members of the same class are now found in the ellipsoid.

It is to be noted that, typically, hundreds of members of a same class may be submitted for the learning process. Of course, this number may vary, depending on the expected rejection rate, nature of the characters to be recognized, etc.

Since such iterations may consume a large quantity of processing time and power, it is preferable to end the iterations when a predetermined percentage of the perfect separation solution is reached. It has been found, in the case where the characters are numbers, that the predetermined percentage is preferably 99.5%. It has been found that a using a percentage of 99.5% is an acceptable compromised between efficiency of the learning process and the time required for the process.

Of course, alternatively, any percentage between 0 and 100% may be used with variable results.

The above-described iteration process is repeated for all classes (step 416) and then stops.

It is to be noted that the $\alpha_i$ coefficients may be adjusted over time to yield vectors that better discriminate different characters and symbols. The goal is to repeat the learning process each time a new character or symbol added to the learning base cause the classes to become linearly unseparable, i.e. the vectors do not allow to distinguish between two characters or symbols.

Moreover, each time the iterative process becomes insufficient, new components may be added to the vectors.

It is to be noted that, even though, the invention has been described with references to characters being letters or numbers, the present invention may also be used to recognized any symbols.

Also, the present methods and systems according to the present invention may be used to recognized both printed and handwritten characters or symbols.

Although the present invention has been described hereinabove by way of preferred embodiments thereof, it can be modified without departing from the spirit and nature of the subject invention, as defined in the appended claims.

What is claimed is:

1. A method for translating a written document into a computer-readable document, said method comprising:

providing a pixel representation of the written document;

providing a vector base comprising a plurality of classes, each said class corresponding to a computer-readable code and comprising a predetermined vector quantization of said corresponding computer-readable code;

identifying a field into said pixel representation of the written document;

segmenting said field, thereby yielding a segmented symbol;

performing a vector quantization on said segmented symbol;

comparing said vector quantization of said segmented symbol with said predetermined vector quantization of each said class, thereby assigning a similarity score between said segmented symbol and each said class; and determining if only one of said similarity scores exceeds a predetermined threshold;

wherein when only one said similarity score exceeds said predetermined threshold, assigning to said segmented symbol a said computer-readable code corresponding to a said class for which said only one similarity score exceeds said predetermined threshold.

2. A method as recited in claim 1, wherein at least two said fields are identified on said pixel representation of the written document; at least two recognition engines, each including a vector quantization method and a vector classification method, being used on applying a character recognition method on each said segmented symbol on said at least two fields.

3. A method as recited in claim 2, wherein a voting method is further used to allow the combination of the results of the at least two recognition engines using at least one of simple averages, weighted averages and veto rules.

4. A method as recited in claim 1, wherein comparing said vector quantization of said segmented symbol with said predetermined vector quantization of each said class is performed by using a separation method selected from the group consisting of an optimal linear separation method, an optimal elliptical separation method, a support vector machine, a quadratic vector machine, a modified quadratic discriminant function, and a K nearest neighbor.

5. A method as recited in claim 1, further comprising: providing a pixel representation of the written document by digitizing said document.

6. A method as recited in claim 1, wherein said field is a generally rectangular portion of said pixel representation of the written document.

7. A method as recited in claim 1, further comprising: recognizing the type of the written document; associating a predetermined format to the written document corresponding to said type of the written document; wherein, identifying said field into said pixel representation of the document is performed by using said predetermined format.

8. A method as recited in claim 7, wherein recognizing the type of the written document includes identifying a predetermined characteristic of the written document.

9. A method as recited in claim 8, wherein said predetermined characteristic includes a general configuration of the written document, text block, dimensions, and lines configurations.

10. A method as recited in claim 1, wherein assigning to said segmented symbol said computer-readable code further comprises: quality controlling said segmented symbol assigned to said computer-readable code.

11. A method as recited in claim 1, further comprising an operator verifying the validity of segmented symbol assigned to a computer-readable code by comparing said segmented symbol assigned to said computer-readable code with a corresponding character on the written document.

12. A method as recited in claim 1, further comprising: formatting said assigned computer-readable code.

13. A method as recited in claim 1, wherein said computer-readable code is an ASCII code.

14. A method for recognizing a character corresponding to a written symbol, said method comprising:
providing a pixel representation of the written symbol;
segmenting said pixel representation, yielding a segmented symbol;
doing a vector quantization on said segmented symbol, yielding a vector representation of said written symbol;
for possible class(i), i ranging from 1 to N, N being the number of different possible classes:
providing a vector representation(i) for each class(i);
computing a similarity score(i) using said vector representation (i) of said symbol and said vector representation for class(i); and
comparing said similarity score(i) to a threshold(i); and
if only one of said similarity score(x) is superior than the corresponding threshold(x), x ranging form 1 to N:
assigning to said written symbol a computer-readable code corresponding to said class(x).

15. A method as recited in claim 14, wherein said vector representation(i) for each class(i) is obtained through an optimal elliptical separation method.

16. A method as recited in claim 14, wherein said threshold(i) is computed using a vector base.

17. A method as recited in claim 14, wherein computing a similarity score(i) is done using a separation method selected from the group consisting of an optimal linear separation method, an optimal spherical separation method, a support vector machine, a quadratic vector machine, a modified quadratic discriminant function, and a K nearest neighbor.

18. A method as recited in claim 14, wherein said computer readable code is an ASCII code.

19. A system for translating a written document into a computer-readable document, said system comprising:
a document digitizer for creating a pixel representation of the document;
a controller coupled to said digitizer for:
receiving said pixel representation of the written document; identifying a field in said pixel representation of the written document;
segmenting said field, thereby yielding a segmented symbol;
performing a vector quantization on said segmented symbol;
comparing said vector quantization of said segmented symbol with said predetermined vector quantization of each said class, thereby assigning a similarity score between said segmented symbol and each said class; and
determining if only one of said similarity scores exceeds a predetermined threshold;
wherein, when only one said similarity score exceeds said predetermined threshold, assigning to said segmented symbol a said computer-readable code corresponding to a said class for which said only one similarity score exceeds said predetermined threshold;
an output device coupled to said controller for displaying said segmented symbol; and
at least one input device coupled to said controller for entering a computer-readable code of a humanly recognized character among displayed segmented symbols.

20. A system as recited in claim 19, wherein said document digitizer is a scanner.

21. A system as recited in claim 19, wherein said document digitizer includes an optical reader.

22. A system as recited in claim 19, wherein said controller is selected from the group consisting of a computer, an electronic control circuit and a programmed chip.

23. A system as recited in claim 19, further comprising a storing device.

24. A system as recited in claim 19, wherein said at least one input device includes at least one of a pointing device and a keyboard.

25. A system for translating a written document into a computer readable document, said system comprising:
- means for providing a pixel representation of the written document;
- means for providing a vector base comprising a plurality of classes, each said class corresponding to a computer-readable code and comprising a predetermined vector quantization of said corresponding computer-readable code;
- means for identifying a field into said pixel representation of the written document;
- means for segmenting said field, thereby yielding a segmented symbol;
- means for performing a vector guantization on said segmented symbol;
- means for comparing said vector quantization of said segmented symbol with said predetermined vector quantization of each said class, thereby assigning a similarity score between said segmented symbol and each said class; and
- means for determining if only one of said similarity scores exceeds a predetermined threshold;
- wherein when only one said similarity score exceeds said predetermined threshold, assigning to said segmented symbol a said computer-readable code corresponding to a said class for which said only one similarity score exceeds said predetermined threshold.

26. A method as recited in claim 1, wherein when more than one said similarity score exceeds said predetermined threshold, said method further comprises submitting said vector quantization of said segmented symbol to a further inspection step.

27. A method as recited in any of claims 26, wherein said further inspection step includes at least one of (a) performing a human inspection step, (b) applying a predetermined field validity rule, (c) verifying in a stored database, (d) verifying in a thesaurus, and (e) applying an Intelligence Character Recognition method on said segmented symbol and a neighbour character segmented symbol.

28. A method as recited in claim 1, wherein when none of said similarity scores exceeds said predetermined threshold, said method further comprises submitting said vector quantization of said segmented symbol to a further inspection step.

29. A method as recited in 28, wherein said further inspection step includes at least one of (a) performing a human inspection step, (b) applying a predetermined field validity rule, (c) verifying in a stored database, (d)verifying in a thesaurus, and (e) applying an Intelligence Character Recognition method on said segmented symbol and a neighbour character segmented symbol.

* * * * *